United States Patent
Lin (10) Patent No.: US 6,778,610 B2
(45) Date of Patent: Aug. 17, 2004

(54) SIMULTANEOUS SEARCH FOR DIFFERENT RESYNC-MARKER PATTERNS TO RECOVER FROM CORRUPTED MPEG-4 BITSTREAMS

(75) Inventor: Tao Lin, Fremont, CA (US)

(73) Assignee: Redrock Semiconductor, Ltd., Sunnyvale, CA (US)

( * ) Notice: Subject to any disclaimer, the term of this patent is extended or adjusted under 35 U.S.C. 154(b) by 676 days.

(21) Appl. No.: 09/681,424

(22) Filed: Mar. 30, 2001

(65) Prior Publication Data
US 2002/0122493 A1 Sep. 5, 2002

Related U.S. Application Data

(63) Continuation-in-part of application No. 09/681,234, filed on Mar. 2, 2001, now Pat. No. 6,728,318.

(51) Int. Cl.[7] .................. H04N 7/12; H04N 11/02; H04N 11/04
(52) U.S. Cl. .................. 375/240.27; 375/240.28
(58) Field of Search .................. 375/240.27, 240.28, 375/240.01, 240.12

(56) References Cited

U.S. PATENT DOCUMENTS

| | | | |
|---|---|---|---|
| 5,455,629 A | 10/1995 | Sun et al. | 348/466 |
| 5,621,772 A | 4/1997 | Maturi et al. | 375/366 |
| 5,686,956 A | 11/1997 | Oh et al. | 348/19 |
| 5,767,799 A | 6/1998 | Maertens et al. | 341/67 |
| 5,852,805 A | 12/1998 | Hiratsuka et al. | 704/500 |
| 5,910,827 A * | 6/1999 | Kwan et al. | 375/240.27 |
| 6,052,415 A * | 4/2000 | Carr et al. | 375/240.12 |
| 6,057,884 A | 5/2000 | Chen et al. | 348/416 |
| 6,160,847 A | 12/2000 | Wu et al. | 375/240.1 |
| 6,304,607 B1 * | 10/2001 | Talluri et al. | 375/240.27 |
| 6,351,494 B1 * | 2/2002 | Kondo et al. | 375/240.27 |
| 6,415,398 B1 * | 7/2002 | Kikuchi et al. | 714/701 |
| 6,421,386 B1 * | 7/2002 | Chung et al. | 375/240.24 |
| 6,658,153 B1 * | 12/2003 | Nakagawa et al. | 382/233 |

OTHER PUBLICATIONS

Fukunaga et al., "MPEG-4 Video Verification Model version 13.3", ISO/IEC JTC1/SC29/WG11, MPEG99/4960. 10/99, pp. 1-18,75-80,105,115-140,160-193.

* cited by examiner

*Primary Examiner*—Andy Rao
*Assistant Examiner*—Charles E Parsons
(74) *Attorney, Agent, or Firm*—Stuart T. Auvinen (57) ABSTRACT

An error-resilient decoder for motion-picture-experts group (MPEG-4) video detects variable-length resync markers together with video packet (VP) headers at the start of each video packet in a video object plane (VOP). An f_code in the VOP header indicates a motion-vector search range and a bit length for all resync markers in the VOP. When the f_code is correctly read, the bitstream is searched for a fixed-length resync markers. However, when an error occurs in this f_code, the length of the resync markers is unknown. A multi-pattern resync marker and VP header decoder searches the bitstream for one of 7 patterns for each possible resync marker bit-length. A match allows the VP header and data to be decoded even when bit errors occur in the VOP header. Faster recovery occurs for corrupted bitstreams such as those transmitted over wireless networks.

20 Claims, 9 Drawing Sheets

| F_CODE | RESYNC MARKER | LENGTH | MOTION VECTOR RANGE (1/2 PXLS) |
|---|---|---|---|
| 1 | 0000 0000 0000 0000 1 | 17-BIT | [-32,31] |
| 2 | 0000 0000 0000 0000 01 | 18-BIT | [-64,63] |
| 3 | 0000 0000 0000 0000 001 | 19-BIT | [-128,127] |
| 4 | 0000 0000 0000 0000 0001 | 20-BIT | [-256,255] |
| 5 | 0000 0000 0000 0000 0000 1 | 21-BIT | [-512,511] |
| 6 | 0000 0000 0000 0000 0000 01 | 22-BIT | [-1024,1023] |
| 7 | 0000 0000 0000 0000 0000 001 | 23-BIT | [-2048,2047] |

| F_CODE | RESYNC MARKER (RM) & VP HEADER PATTERN FOR QCIF VIDEO | PATTERN MEANING |
|---|---|---|
| 1 | 0000 0000 0000 0000 1 XXXXXXX YYYYY 1 | 17-BIT RM+7-BIT MB#+Q SCALE+HEC BIT |
| 2 | 0000 0000 0000 0000 01 XXXXXXX YYYYY 1 | 18-BIT RM+7-BIT MB#+Q SCALE+HEC BIT |
| 3 | 0000 0000 0000 0000 001 XXXXXXX YYYYY 1 | 19-BIT RM+7-BIT MB#+Q SCALE+HEC BIT |
| 4 | 0000 0000 0000 0000 0001 XXXXXXX YYYYY 1 | 20-BIT RM+7-BIT MB#+Q SCALE+HEC BIT |
| 5 | 0000 0000 0000 0000 0000 1 XXXXXXX YYYYY 1 | 21-BIT RM+7-BIT MB#+Q SCALE+HEC BIT |
| 6 | 0000 0000 0000 0000 0000 01 XXXXXXX YYYYY 1 | 22-BIT RM+7-BIT MB#+Q SCALE+HEC BIT |
| 7 | 0000 0000 0000 0000 0000 001 XXXXXXX YYYYY 1 | 23-BIT RM+7-BIT MB#+Q SCALE+HEC BIT |

FIG. 5A

| F_CODE | RESYNC MARKER (RM) & VP HEADER PATTERN FOR CIF VIDEO | PATTERN MEANING |
|---|---|---|
| 1 | 0000 0000 0000 0000 1XXXXXXXX YYYYY 1 | 17-BIT RM+9-BIT MB#+Q SCALE+HEC |
| 2 | 0000 0000 0000 0000 01 XXXXXXXX YYYYY 1 | 18-BIT RM+9-BIT MB#+Q SCALE+HEC |
| 3 | 0000 0000 0000 0000 001 XXXXXXXX YYYYY 1 | 19-BIT RM+9-BIT MB#+Q SCALE+HEC |
| 4 | 0000 0000 0000 0000 0001XXXXXXXX YYYYY1 | 20-BIT RM+9-BIT MB#+Q SCALE+HEC |
| 5 | 0000 0000 0000 0000 0000 1 XXXXXXXXXYYYYY1 | 21-BIT RM+9-BIT MB#+Q SCALE+HEC |
| 6 | 0000 0000 0000 0000 0000 01XXXXXXXXXYYYYY1 | 22-BIT RM+9-BIT MB#+Q SCALE+HEC |
| 7 | 0000 0000 0000 0000 0000 001XXXXXXXXXYYYYY1 | 23-BIT RM+9-BIT MB#+Q SCALE+HEC |

SIMULTANEOUS SEARCH FOR DIFFERENT RESYNC-MARKER PATTERNS TO RECOVER FROM CORRUPTED MPEG-4 BITSTREAMS

CROSS REFERENCE TO RELATED APPLICATIONS

This application is a continuation-in-part of the co-pending application for Error Recovery of Corrupted MPEG-4 Bitstreams Using Fuzzy Decoding of Start Codes and Resync Markers, U.S. Ser. No. 09/681,234, filed Mar. 2, 2001.

BACKGROUND OF INVENTION

This invention relates to video compression, and more particularly to error recovery from errors in synchronization fields.

Video is an important part of a rich multimedia experience. Personal computers (PC's) and various other computing devices have delivered video feeds to users over the Internet. However, processing of video bitstreams or feeds is among the most data-intensive of all common computing applications. Limited communication-line bandwidth has reduced the quality of Internet video, which is often delivered in small on-screen windows with jerky movement.

To mitigate the problems of large video streams, various video-compression techniques have been deployed. Compression standards, such as those developed by the motion-picture-experts group (MPEG), have been widely adopted. These compression techniques are lossy techniques, since some of the picture information is discarded to increase the compression ratio. However, compression ratios of 99% or more have been achieved with minimal noticeable picture degradation.

Portable hand-held devices such as personal-digital-assistants and cellular telephones are widely seen today. Wireless services allow these devices to access data networks and even view portions of web pages. Currently the limited bandwidth of these wireless networks limits the web viewing experience to mostly text-based portions of web pages. However, future wireless networks are being planned that should have much higher data transmission rates, allowing graphics and even video to be transmitted to portable computing and communication devices.

Although proponents of these next-generation wireless networks believe that bandwidths will be high enough for high-quality video streams, the inventor realizes that the actual data rates delivered by wireless networks can be significantly lower than theoretical maximum rates, and can vary with conditions and local interference. Due to its high data requirements, video is likely to be the most sensitive service to any reduced data rates. Interference can cause intermittent dropped data over the wireless networks.

Next-generation compression standards have been developed for transmitting video over such wireless networks. The MPEG-4 standard provides a more robust compression technique for transmission over wireless networks. Recovery can occur when parts of the MPEG-4 bitstream is corrupted.

Figure 1:
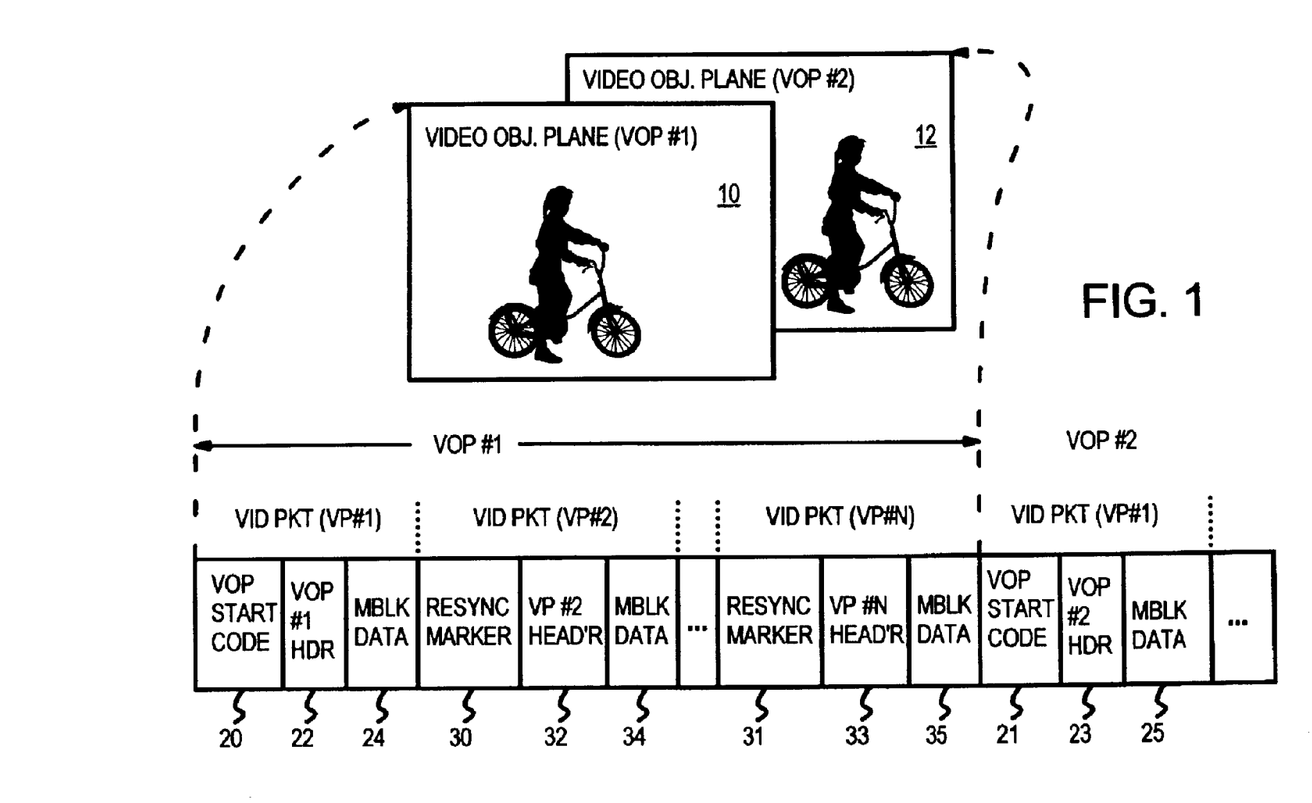
FIG. 1 shows a MPEG-4 bitstream that is composed of video object planes and video packets.

FIG. 1 shows a MPEG-4 bitstream that is composed of video object planes and video packets. The video is sent as a series of picture frames known as video object planes (VOP). These picture frames are replaced at a fixed rate, such as every 30 milliseconds to give the illusion of picture movement. Rather than transmit every pixel on each line, the picture is divided into macroblocks and compressed by searching for similar macroblocks in earlier or later frames and then replacing the macroblock with a motion vector or data changes.

Video object planes VOP 10, 12 are two frames in a sequence of many frames that form a video stream. Pixel data in these planes are compressed using macroblock-compression techniques that are well-known and defined by the MPEG-4 standard. The compressed picture data is divided into several video packets (VP) for each video object plane VOP.

Each video object plane begins with a VOP start code, such as VOP start code 20 which begins VOP #1 (10), an VOP start code 21, which begins VOP #2 (12). First video object plane VOP 10 has VOP header 22 that follows VOP start code 20, and data field 24 which contains the beginning of the picture data for VOP 10.

After a predetermined amount of data, such as 100 to 1000 bits, a new video packet begins with resync marker 30 and VP header 32. Data field 34 continues with the picture data for VOP 10. Other video packets follow, each beginning with a resync marker and VP header, followed by a data field with more of the picture data for VOP 10. The last video packet VP #N in VOP 10 begins with resync marker 31 and VP header 33, and is followed by the final picture data for VOP 10, in data field 35.

The second video object plane VOP 12 begins with VOP start code 21 and VOP header 23, and is followed by data field 25, which has the first picture data for the second picture frame, VOP 12. Other video packets follow for VOP 12.

The VOP headers include a VOP coding type (I, P, or B), VOP time, rounding type, quantization scale, f_code, while the VP headers include a macroblock number for the first macroblock in the packet, quantization scale, VOP coding type and time. The headers can include other information as well.

The VOP start codes and VP resync markers contain unique bit patterns that do not occur in the headers or data fields. The video object plane VOP start code is:

0000 0000 0000 0000 0000 0001 1011 0110.

This code is defined by the MPEG-4 standard. The start code is 000001 B6 in Hexadecimal notation. The start code begins with a string of 23 zero bits. The picture data in the macroblock data fields are encoded so that they never have such a long string or run of zero bits. Likewise, the headers do not have such a long run of zero bits. Thus the start code is unique within the video bitstream, allowing a bitstream decoder to easily detect the start code.

Figure 2:
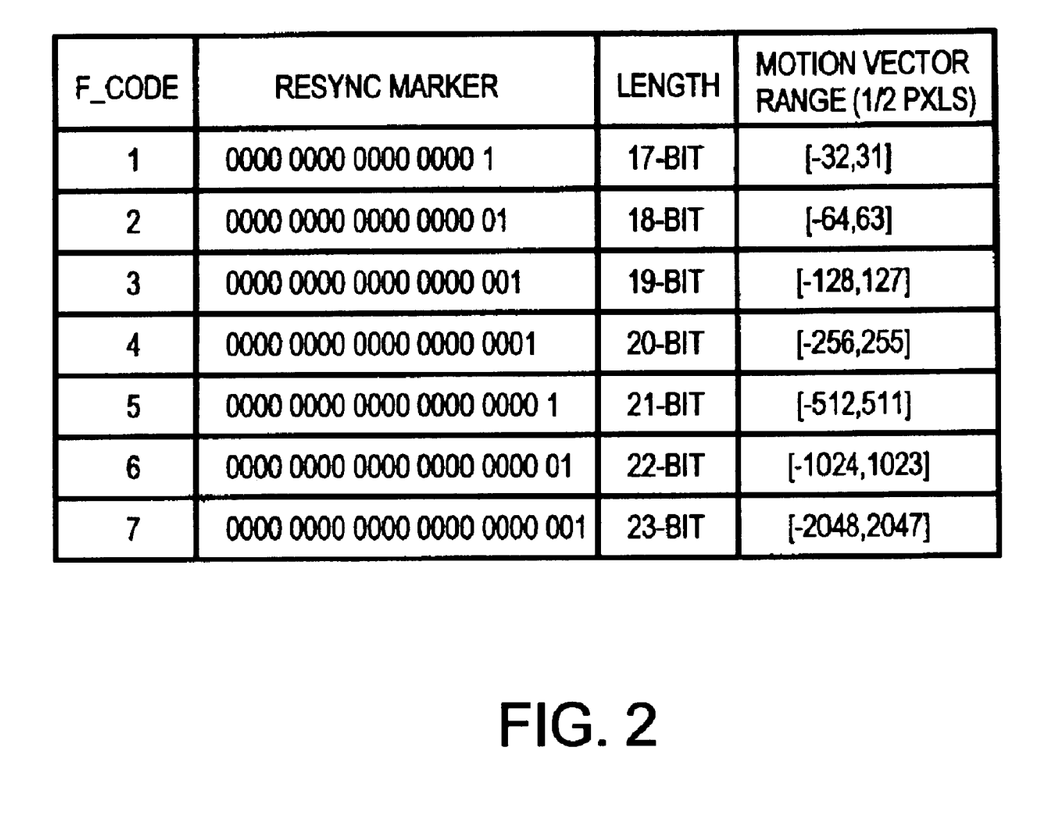
FIG. 2 is a table of codes for the resync markers that marks the beginning of a new video packet.

FIG. 2 is a table of codes for the resync markers that marks the beginning of a new video packet. An f_code for each VOP is encoded into a 3-bit field in the VOP header. When the VOP specifies that the frame's f_code is 1, then each video packet VP in the frame begins with a 17-bit resync marker:

0000 0000 0000 0000 1 which has an initial run of 16 zeros.

When f_code is set to 3, a 19-bit resync marker is used for all video packets in the frame, with an initial run of 18 zero bits. The f_code can be set to values from 1 to 7. For f_code=7, a 23-bit resync marker with an initial run of 22 zero bits is specified. Different values of f_code and the corresponding resync markers used are shown in the table, along with the lengths of the resync markers, which vary from 17 to 23 bits.

All resync markers begin with a long run of zero bits, from 16 to 22 bits of zero. Note that the VOP start code is 24 bits, longer than any possible resync marker. The VOP start code has a longer run of 23 zero bits, allowing the VOP start code to be distinguished from the VP resync markers.

The f_code also specifies the motion-vector search range used by the encoder and thus the number of bits that can be used to encode the motion vector. For f_code=1, the maximum search range is [−32,31] half-pixels, or about +/−16 pixels, with a half-pixel resolution. The search range doubles for each higher value of f_code, to [−64,63] for f_code=2, up to [−2048,2047] for the maximum f_code=7. This provides a maximum search range of about 1K pixels.

Larger search ranges are desirable since the encoder is more likely to find a pixel match for a macroblock within a larger area of the image. Thus encoding efficiency improves when larger search ranges and larger f_codes are used.

A simplification of the MPEG-4 standard sets the f_code to 1 for all video packets. This simplification is known as simple profile level 0. In this case the resync markers are always:

0000 0000 0000 0000 1 which has an initial run of 16 zeros. While useful for simplifying the search for resync markers, limiting the f_code to 1 also limits the motion-vector search range and thus the coding efficiency.

Figure 3:
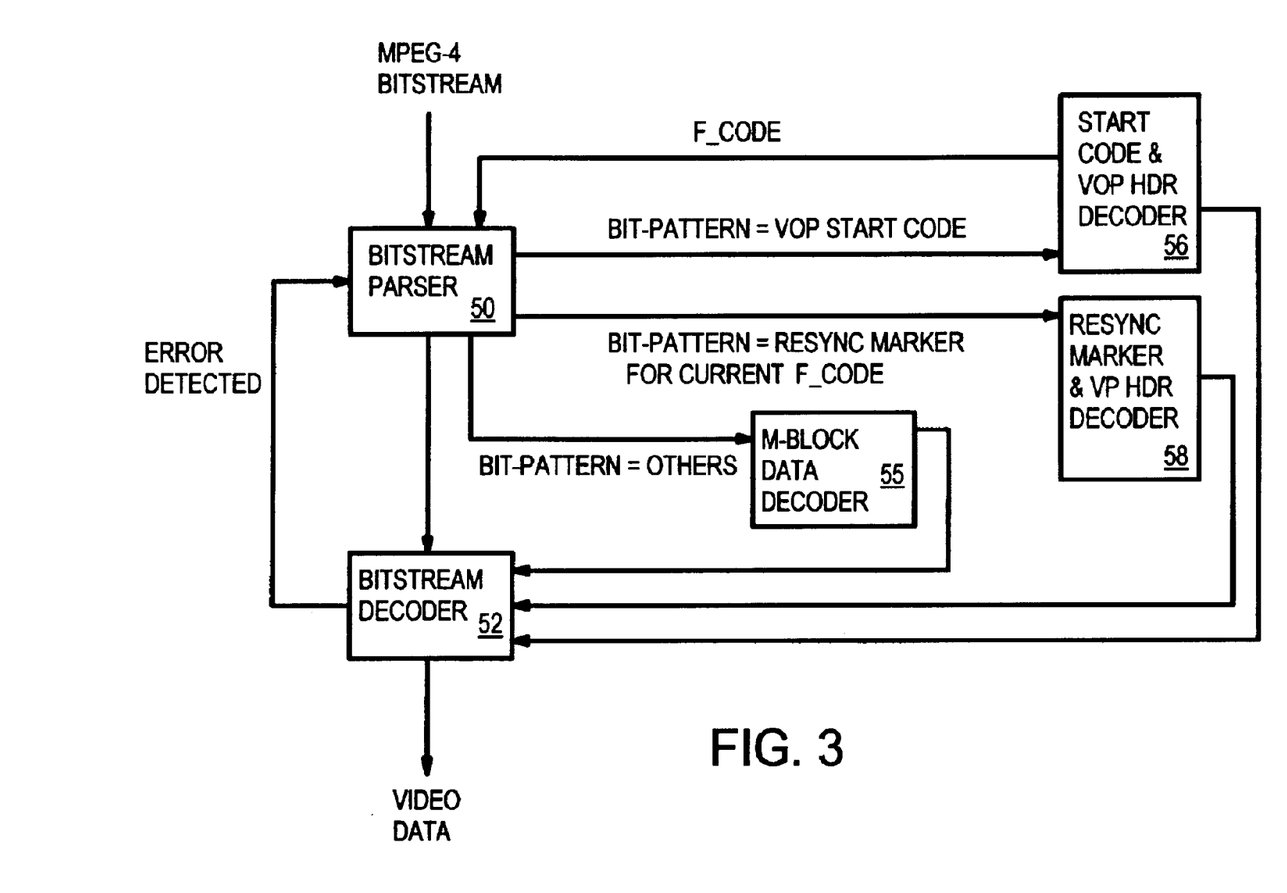
FIG. 3 is a diagram of an MPEG-4 decoder.

FIG. 3 is a diagram of an MPEG-4 decoder. The MPEG-4 bitstream is parsed by parser 50, which searches for start-code and resync bit patterns. A bit-wise comparator can be used, comparing the last N bits received to a Q-bit pattern of the start code or resync marker. When the last N bits match the VOP start code, start-code and VOP header decoder 56 sends some of the VOP header information to bitstream decoder 52 and instructs it to decode the bits following the VOP header as the data field of the initial video packet. The f_code from the VOP header is sent back to bitstream parser 50. Parser 50 then searches for the next packet by searching for a resync marker with the number of bits indicated by the f_code, as shown in FIG. 2. The picture data from the data field is output as the video data for further processing of motion vectors and macroblocks (de-compression).

When the last N bits received by parser 50 match the resync bit pattern for the current f_code, resync marker and VP header decoder 58 decodes the following bits as the VP header and instructs bitstream decoder 52 to decode the bits following the header as the data field for the video packet. The picture data from the data field is output as the video data for further processing of motion vectors and macroblocks.

When the bit pattern is neither a start code, nor a resync marker or their headers, macroblock decoder 55 decodes the data fields into the macroblock descriptions, motion vectors, and discrete cosine transform (DCT) coefficients of the picture data.

Errors can be detected when an invalid motion vector or discrete cosine transform (DCT) code is found. However, there is no standard error-detection method. When an error is detected by bitstream decoder 52, parser 50 is instructed to search for the next VOP start-code or VP resync marker. Any data in the bitstream is ignored once the error occurs until the next start code or resync marker is found. When start-code decoder 56 finds a start code in the bitstream, decoding can continue with the next VOP header. The data following the VOP header is processed, but any video data after the error until the VOP header is discarded since the location of the macroblocks and motion vectors in the bitstream are uncertain due to loss of sync from the error. Backward decoding may be used to recover some of the lost video data when reversible variable-length coding is used.

When resync marker decoder 58 finds a resync marker for the current f_code in the bitstream, decoding can continue with the next VP header. The data following the VP header is processed, but any video data after the error until the VP header is discarded due to the loss sync caused by the error. If reversible variable-length coding is used, some of the lost video data may be recovered by backward decoding.

When an error occurs, the remaining data in the video packet is lost. However, data in the next video packet can be used since the bitstream is re-synced by detection of the unique bit pattern, either the start code or resync marker.

Figure 4A:
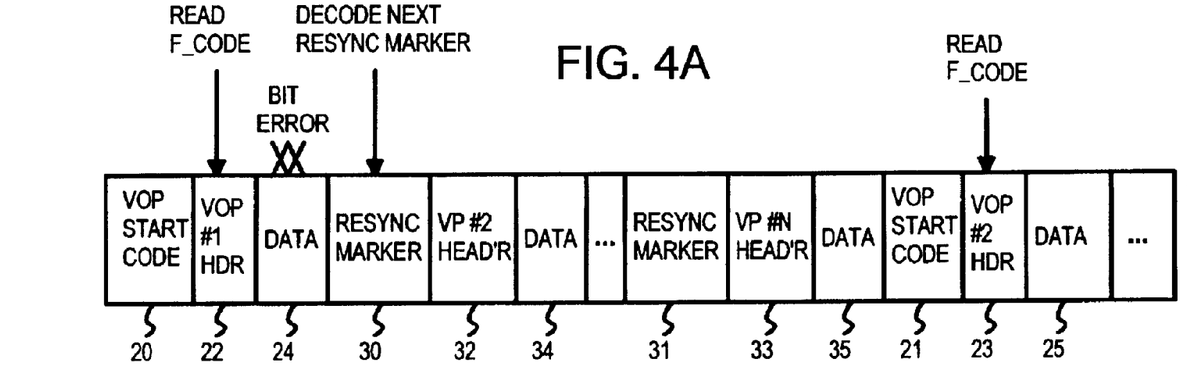
FIG. 4A shows recovery from bit errors in a video packet.

FIG. 4A shows recovery from bit errors in a video packet. When the bitstream is transmitted over a wireless network, some corruption of the data is possible. The f_code for VOP #1 is read from VOP #1 header 22. This f_code is used to set the bit-length of the resync marker bit-pattern to search for.

In this example, a data error occurs in data field 24 in the first video packet of VOP #1. The remaining data in data field 24 is discarded, but the decoder searches for and finds the next resync marker 30. VP header 32 following resync marker 30 is decoded, and data processing resumes with data field 34 in the second video packet. Thus the only data lost is some of the data in data field 24.

Start code 21 is detected for the second frame, VOP #2. Second VOP header 23 is decoded, and the new f_code for VOP #2 is read to set the bit-length of resync markers in VOP #2. Data processing continues with the data in data field 25.

Dividing data from each video object plane into several video packets reduces the amount of lost data when a bitstream error occurs. Data from just one video packet is lost for each error. Only a portion of a frame is lost, such as less than 1/Nth of a frame when the video object plane is divided into N video packets.

Figure 4B:
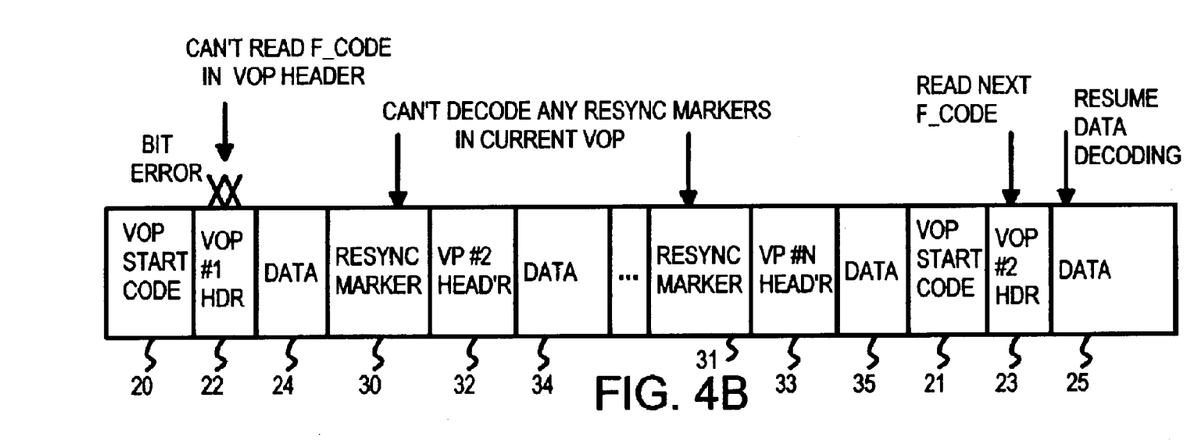
FIG. 4B shows a slow recovery from bit errors that corrupt the f_code in the VOP header.

Unfortunately, some kinds of bit errors are more difficult to recover from. FIG. 4B shows a slow recovery from bit errors that corrupt the f_code in the VOP header. Although start code 20 for VOP #1 is detected, a bit error in VOP header 22 prevents the f_code from being read properly. Macroblock data in data field 24 may be readable, or the bit error may prevent detecting the location of data field 24.

A more serious problem is that the exact length of the next resync marker is not known, since the f_code was not read from VOP header 22. Without knowing the length of the resync marker pattern, resync marker 30 for the second video packet (VP) of VOP #1 cannot be decoded, and data in data field 34 is discarded since the exact start of this field is not known.

Further aggravating the problem is that none of the resync markers in the entire video object plane VOP #1 can be detected, since their bit-length is known only by the f_code that was corrupted in VOP header 22. Thus resync marker 31 and its data field 35 cannot be located. Indeed, all data in all subsequent video packets in the current VOP are lost. The format of resync markers 30, 32 depends on the f_code.

Although the f_code is included in some VP headers, the exact location of the f_code in the VP headers is unknown when the resync marker preceding the VP header cannot be located. Thus having the f_code in the VP headers is not helpful when the resync markers cannot be located when their length is unknown.

The decoder finally is able to match start code 21 for the next VOP #2. Its VOP #2 header 23 is read to get the f_code for VOP #2. This allows subsequent resync markers to be decoded in the second video packet in VOP #2.

Data does not resume decoding until data field 25. An entire frame or video object plane is lost because the f_code in VOP header 22 was corrupted. Indeed, detecting such an error is difficult, since the corrupted f_code may appear to be another valid f_code, causing the resync-marker decoder to search for the wrong resync marker pattern. Subsequent resync markers in the VOP are not found, causing loss of data. Since the format of the motion vectors also depends on the f_code. Thus decoding of motion vectors cannot occur until the f_code is known.

Thus all data from the first to Nth video packets in VOP #1 are lost. An entire video frame is thus lost when a bit error occurs in the f_code in the VOP header. To prevent such serious errors, some MPEG encoders use a fixed f_code of 1 for all VOP's. However, this is undesirable since it limits the motion-vector range to a small area of only +/−16 pixels.

What is desired is a bitstream decoder that locates resync markers of video packets despite bit errors that occur in the VOP header. A robust sync detector is desired that can more quickly recover from bitstream errors. An MPEG-4 decoder that can recover from a corrupted bitstream within one video packet is desirable to minimize loss of picture data. An MPEG-4 decoder that can locate resync markers when the f_code in the VOP header is unreadable or corrupted is desired.

DETAILED DESCRIPTION

The present invention relates to an improvement in MPEG error resilience. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that pattern matching for the resync markers can be extended to also include pattern matching in the video-packet header that immediately follows the resync marker. Better coding efficiency is achieved when larger motion-vector search ranges are allowed, requiring that larger f_codes be used. Although the f_code may not be known when a bit error occurs in the VOP header, by searching for both the resync marker and the packet header, the start of subsequent video packets can be located.

The inventor further realizes that the resync marker can match any one of several patterns when f_code can take on any value. Since the resync markers can have several patterns, all patterns are be searched for simultaneously.

When any of the seven valid resync-marker bit patterns are found, followed by a proper video packet header, the data in the packet is decoded. Thus an error in the initial VOP header can be recovered from more quickly, since the location of subsequent packets can be found by matching both one of the 7 resync-marker patterns and the pattern of the video packet header.

Figure 5A:
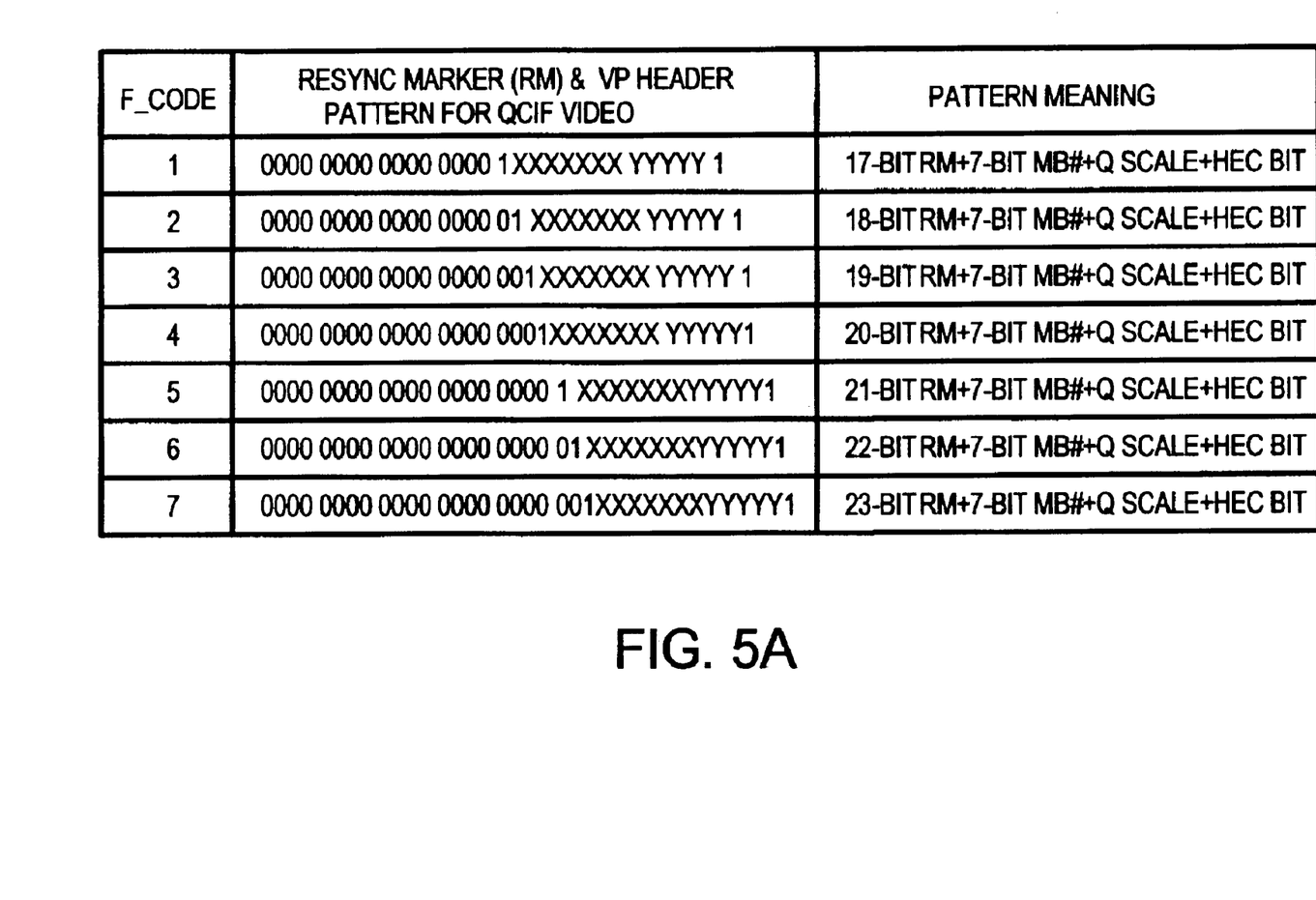
FIG. 5A is a table of resync-marker and VP header patterns to searched for when a quarter-size QCIF video format is encoded.

FIG. 5A is a table of resync-marker and VP header patterns to searched for when a quarter-size video format is encoded. The table shows the resync marker and video-packet VP header bit patterns when the bitstream encodes a quarter common image format (QCIF) video stream. The QCIF video-stream format designates a 176×144 pixel resolution video.

The second column of the table shows the bit-pattern for both the resync marker and the VP header for each of the seven f_codes shown in the first column. Higher values of f_code use a larger motion-vector range as shown earlier in FIG. 2. The larger f_codes thus produce better coding efficiency.

The first 17 to 23 bits of each pattern is the resync marker. The resync marker (RM) has a string of zero bits followed by a single one bit. The number of zero bits varies with the f_code. Thus the RM for f_code=1 has a series of 16 zero bits followed by a 1 bit, for a total of 17 bits. The f_code=7 RM has 22 zero bits followed by a 1 bit, for a total of 23 bits. The third column of the table shows that the patterns each begin with a resync marker (RM) of 17-bits to 23-bits.

The last bit in each header bit-pattern is the Header Extension Code (HEC) bit. When the HEC bit is 0, then VP header that follows the RM contains only a macroblock number, and a quant scale (the quantization factor Q). When the HEC bit is 1, then the VP header also has addition information, such as a VOP time, an operation coding type (I for Intra-coded, no prediction, P for prediction from Previous VOP, B for Bi-directional prediction from previous and next VOPs), a VOP f_code, etc. This additional information is not shown but follows the HEC bit in the VP header. When HEC=0, the VP header does not contain the f_code and lacks enough information to decode the data in the VP when the VOP header is corrupted.

The XXXXXXX field in each pattern is the 7-bit macroblock number. The macroblock number is the identifier for the first macroblock in the video packet. There are usually many other macroblocks in each packet that appear in sequential order. For QCIF resolution, there are 99 macroblocks in a frame; therefore, a 7-bit macroblock number field is used to number the macroblocks from 0 to 98.

The YYYYY field in each bit pattern is the quantization factor or Q_SCALE. Q_SCALE is used during encoding to divide the discrete cosine transform (DCT) coefficients for the pixels or error terms in each macroblock in the video packet. The decoder multiplies each quantized DCT coefficient received with the Q_SCALE to recover the pre-scaled DCT coefficients.

Although the macroblock field and the Q scale field can take on any value, the resync marker and HEC bits must match the bit-patterns exactly for a valid resync marker and VP header to be found. The exact pattern matched indicates the f_code. Thus resync markers can be detected even when the f_code was corrupted by a bit error in the VOP header.

Figure 5B:
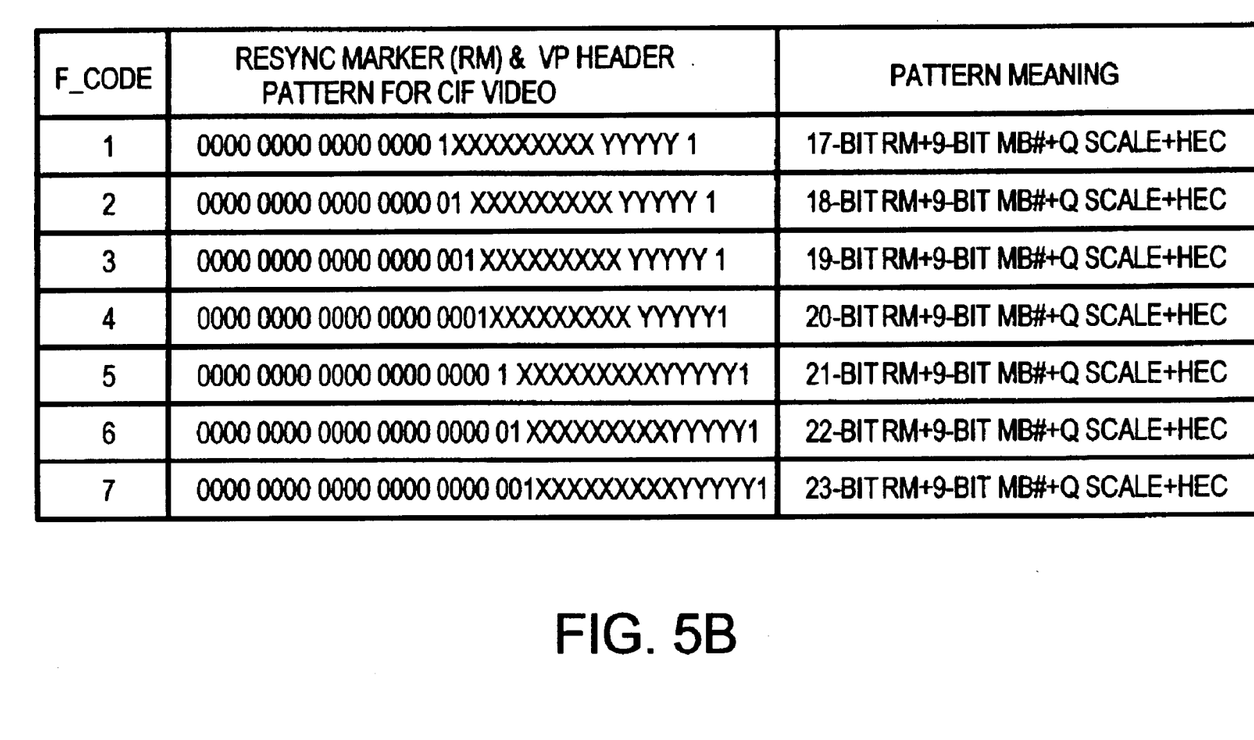
FIG. 5B is a table of resync-marker and VP header patterns to searched for when a full-size CIF video format is encoded.

FIG. 5B is a table of resync-marker and VP header patterns to be searched for when a full-size CIF video format is encoded. The table shows the resync marker and video-packet VP header bit patterns when the bitstream encodes a common image format (CIF) video stream. The QCIF video-stream format designates a 352×288 pixel resolution video.

The second column of the table shows the bit-pattern for both the resync marker and the VP header for each of the seven f_codes shown in the first column. The first 17 to 23 bits of each pattern is the resync marker (RM). The number of zero bits in each RM varies with the f_code. The third column of the table shows that the bit-patterns each begin with a resync marker (RM) of 17-bits to 23-bits.

The XXXXXXXXX field in each pattern is the 9-bit macroblock number. The macroblock number is the identifier for the first macroblock in the video packet. For CIF resolution, there are 396 macroblocks in a frame; therefore, the 9-bit macroblock number field is used to number the macroblocks from 0 to 395.

The YYYYY field in each bit pattern is the 5-bit quantization factor or Q_SCALE. The last bit in each header bit-pattern is the Header Extension Code (HEC) bit.

As before, the macroblock field and the Q scale field can take on any value, but the resync marker and HEC bits must match the bit-patterns exactly for a valid resync marker and VP header to be found by the decoder. The exact bit-pattern or row in the table matched indicates the f_code. Resync markers can thus be detected even when the f_code was corrupted by a bit error in the VOP header.

The bit-patterns in FIG. 5B differ from those in FIG. 5A because a 9-bit macroblock number is used for the higher-resolution CIF format of FIG. 5B. The lower QCIF resolution uses 7-bit macroblock numbers. Since both formats are common, the decoder can be configured to recognize either set of bit-patterns.

Figure 6:
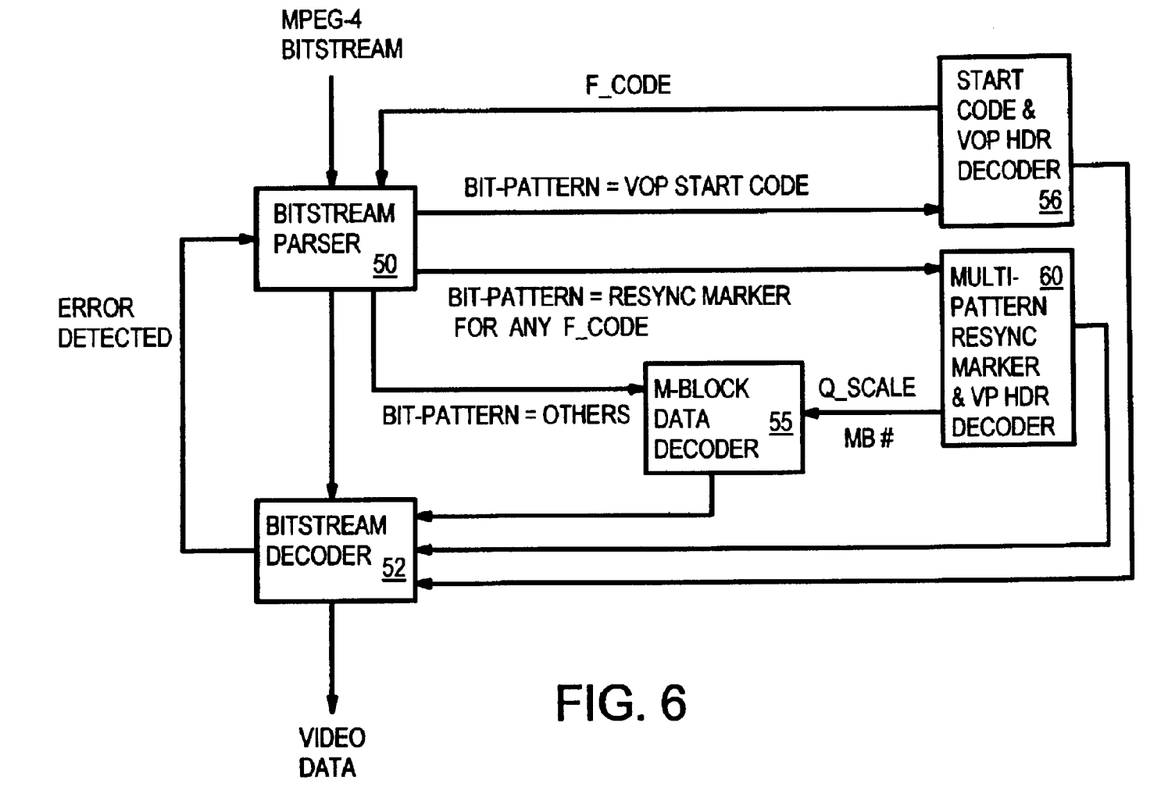
FIG. 6 shows an MPEG decoder with error resilience that detects resync markers after an error in reading the f_code.

FIG. 6 shows an MPEG decoder with error resilience that detects resync markers after an error in reading the f_code. An MPEG-4 bitstream is parsed by parser 50, which searches for start-code and resync-marker bit patterns. A bit-wise comparator can be used, comparing the last N bits received to a Q-bit pattern of the start code or resync marker. When the last N bits match the VOP start code, start-code and VOP header decoder 56 sends some of the VOP header information to bitstream decoder 52 and instructs it to decode the bits following the VOP header as the data field of the initial video packet. The f_code from the VOP header is sent back to bitstream parser 50. Parser 50 then searches for the next packet by searching for a resync marker with the number of bits indicated by the f_code, as shown in FIG. 2. The picture data from the data field is output as the video data for further processing of motion vectors and macroblocks (de-compression).

When the last N bits received by parser 50 match the resync bit pattern for the current f_code, multi-pattern resync marker and VP header decoder 60 decodes the following bits as the VP header and instructs bitstream decoder 52 to decode the bits following the header as the data field for the video packet. The picture data from the data field is output as the video data for further processing of motion vectors and macroblocks.

When the bit pattern is neither a start code, nor a resync marker or their headers, macroblock decoder 55 decodes the data fields into the macroblock descriptions, motion vectors, and discrete cosine transform (DCT) coefficients of the picture data.

Errors can be detected when an invalid motion vector or discrete cosine transform (DCT) code is found. However, there is no standard error-detection method. When an error is detected by bitstream decoder 52, parser 50 is instructed to search for the next VOP start-code or VP resync marker. When start-code decoder 56 finds a start code in the bitstream, decoding can continue with the next VOP header. The data following the VOP header is processed. Backward decoding may be used to recover some of the lost video data when reversible variable-length coding is used.

Error Recovery from F_Code Error

When a bit error occurs in the VOP header, preventing the f_code from being read by start-code decoder 56 and sent to bitstream parser 50, multi-pattern resync marker decoder 60 is instructed to search for all possible resync-marker and VP header bit-patterns. These patterns are shown in FIG. 5A for QCIF video and in FIG. 5B for CIF video formats. Multi-pattern resync marker decoder 60 searches for these patterns by comparing the last M bits parsed by bitstream parser 50 to the 30-to-38-bit patterns of FIG. 5A or 5B. Bits in the patterns marked X or Y can be either 0 or 1 and still match, since these are macroblock numbers or Q_SCALE factors. Since more bits are compared than just the bits in the resync marker or start code, M is larger than N.

When multi-pattern resync marker decoder 60 finds a matching bit pattern after an f_code error, the macroblock number and Q-scale factor are sent to macroblock decoder 55. Bitstream decoder 52 is signaled to decode the data following the VP header as macroblock data. Thus the macroblock data following any of the resync marker and VP header patterns is recovered, despite the failure to read the f_code in the initial VOP header.

Multi-pattern resync marker decoder 60 continues to search bits in the current frame or VOP until then next start code signals the next frame. Other video packets in the current VOP can be detected by the multi-pattern matching despite the failure to read the f_code. Macroblock data in these other video packets can also be recovered from the frame with the faulty f_code.

When an f_code error occurs, the remaining data in the second and later video packets can thus be recovered by multi-pattern matching. Once the start of the next frame is detected, the multi-pattern matching can be disabled.

Figure 7:
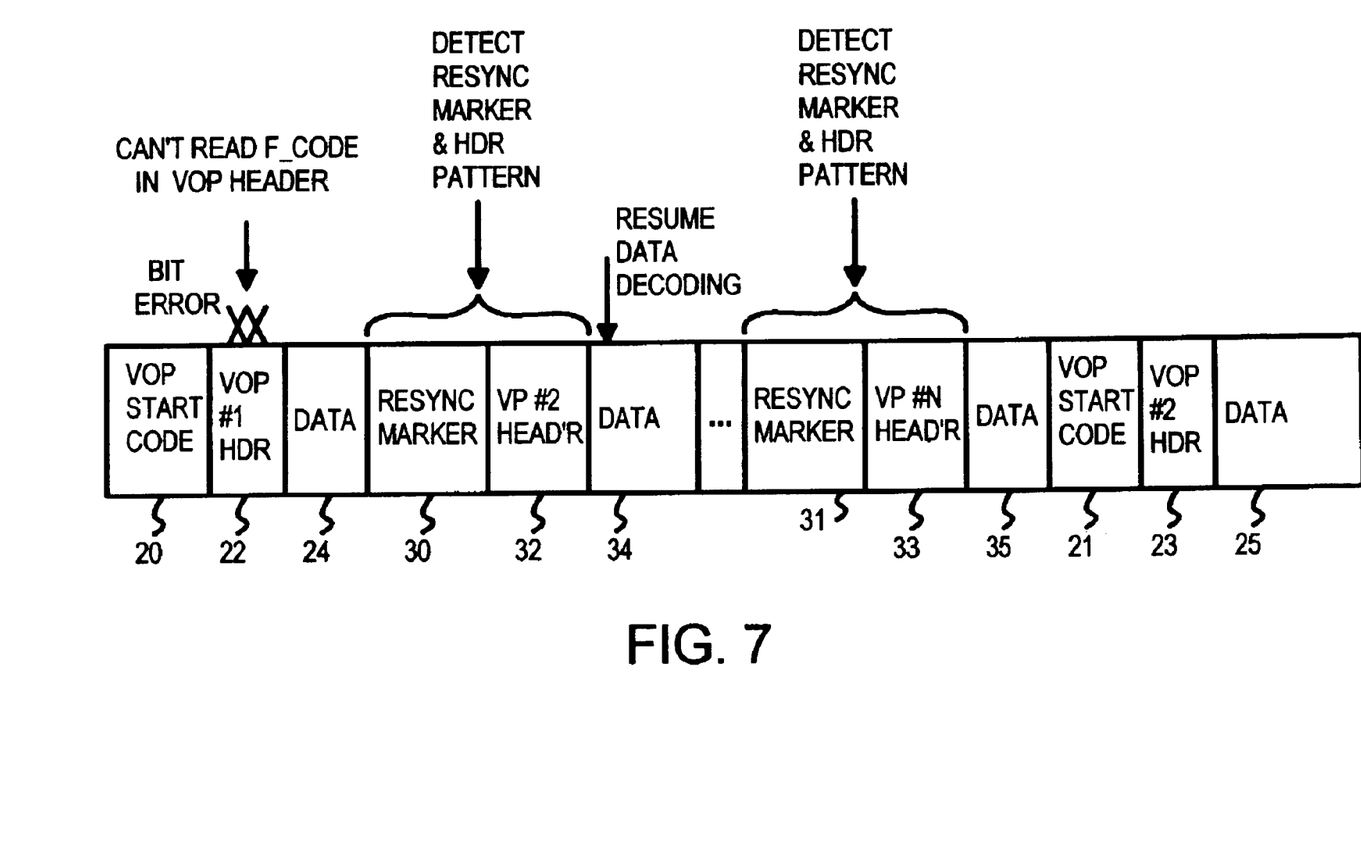
FIG. 7 shows rapid recovery from bit errors that corrupt the f_code in the VOP header.

FIG. 7 shows rapid recovery from bit errors that corrupt the f_code in the VOP header. Although start code 20 for VOP #1 is detected, a bit error in VOP header 22 prevents the f_code from being read properly. Macroblock data in data field 24 may be readable, or the bit error may prevent finding the exact location of data field 24 and thus render it unreadable.

A serious problem is that the exact length of the next resync marker is not known, since the f_code was not read from VOP header 22. Although the length of the resync marker pattern is not known, by matching all possible resync-marker patterns and the following VP header pattern, resync marker 30 for the second video packet (VP) of VOP #1 can be decoded, along with VP #2 header 32. The data in data field 34 can be recovered since the exact start of this field is known once fields 30, 32 are correctly decoded.

The multi-pattern resync marker decoder is able to search for all possible valid patterns for both resync marker 30 and VP header 32. When one of the valid bit-patterns is found, recovery of data in data field 34 is possible.

Other video packets are also detected by the multi-pattern resync marker decoder. The Nth video packet is detected when resync marker 31 and VP header 33 match one of the valid bit-patterns searched for by the multi-pattern resync marker decoder. Then macroblock data in data field 35 is read, allowing most of the image of the first VOP to be displayed, with the possible exception of the initial video packet's data field 24.

All of the resync markers in the entire video object plane VOP #1 can be detected by multi-pattern matching, even though their bit-length is unknown because the f_code in VOP header 22 was corrupted. Resync-marker detection is achieved despite that the format of these resync markers 30, 32 depend on the unknown f_code.

The decoder is later able to match start code 21 for the next VOP #2. Its VOP #2 header 23 is read to get the next f_code for VOP #2. This allows the multi-pattern matching to be disabled for the next frame.

Figure 8:
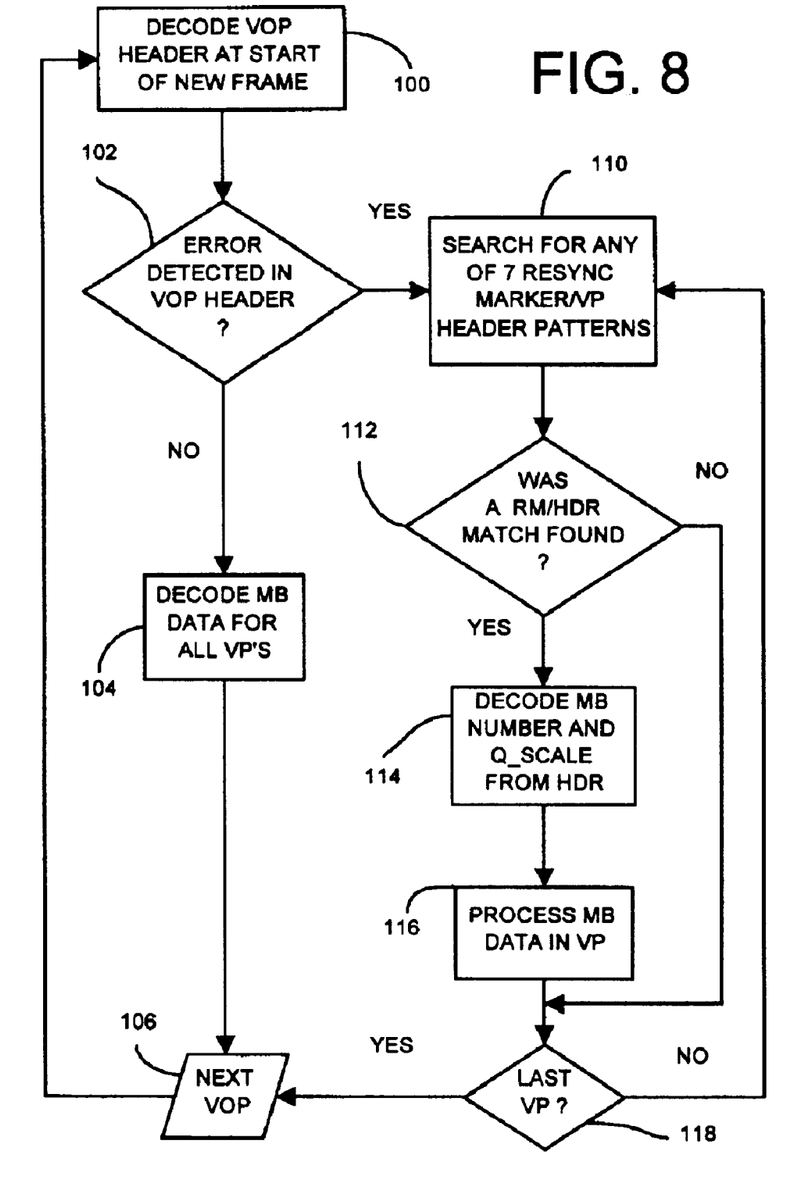
FIG. 8 is a flowchart of error detection and recovery when the f_code is corrupted.

FIG. 8 is a flowchart of error detection and recovery when the f_code is corrupted. A new frame or video object plane (VOP) is detected by decoding the unique start code, step 100. The frame or VOP header is decoded immediately after the start code. This VOP header contains the f_code for the frame. The f_code determines the range of the motion vectors and the bit-length of the resync markers in an MPEG-4 bitstream.

When an error is detected such as by a zero-valued marker bit in the VOP header, step 102, them the multi-pattern resync marker decoder searches the bitstream for all 7 bit-patterns for the resync marker and VP header, step 110. The bit-patterns of FIG. 5A are searched for when the video resolution is QCIF, while the bit-patterns of FIG. 5B are searched for when the video resolution is CIF.

When no pattern match is found, step 112, searching continues in the bitstream, possibly with other video packets, step 118, until a matching bit-pattern is found, step 110, or the next VOP start code is decoded, steps 106, 100.

When the bitstream matches one of the 7 bit-patterns, step 112, a resync marker has been detected and a new video packet found. The macroblock number of the first macroblock in the video packet, and the Q-scale factor are read from the VP header, step 114. These are used to process the macroblock data in the data field that follows the detected resync marker and VP header, step 116. Encoded DCT coefficients are decoded, de-quantized by multiplying with the Q-scale factor, and inversely-transformed to recover the pixel or error-term data used to generate the display data.

When the last video packet has not yet been reached, step 118, then searching by the multi-pattern resync marker decoder resumes, step 110. Other video packets in the frame can be detected and their macroblock data processed. Once the last video packet has been processed, step 118, the next start code for the next VOP is decoded, steps 106, 100.

When no error is detected in the VOP header, step 102, the correct f_code is available, so the exact bit-length of the resync markers in the frame is known. Processing of macroblock data in each video packet can proceed normally, step 104. The multi-pattern resync marker decoder only has to search for one bit-pattern, the resync-marker pattern for the indicated f_code.

Alternate Embodiments

Several other embodiments are contemplated by the inventor. For example the decoders can be implemented in a variety of ways, such as by firmware routines in a digital-signal processor (DSP) chip, or in logic in a logic array chip, or as software routines executed by a processor, or a combination of techniques. The decoder, parser, and bit comparators can be partitioned in many different ways, and the bit comparison can be performed serially by a state machine, or in parallel using a shift register. A programmable register can allows the multi-pattern resync marker and VP header decoding to be disabled, or allow for different bits to be masked off from comparison, such as different numbers of macroblock number bits.

Other video formats could be supported besides QCIF and CIF. The exact bit-patterns matched can be adjusted for other format specifications. Many other functional blocks can exist in a complex MPEG decoder, and pipelining logic and staging registers may also be present.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line, or software flags, parameters, or bits.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An error-resilient motion-picture-experts group (MPEG) decoder comprising:

a bitstream input for receiving an MPEG bitstream, the MPEG bitstream being a sequence of video packets arranged into video object planes (VOP), each video object plane encoding an image frame of a video;

wherein each video packet (VP) after a first video packet in a video object plane begins with a resync marker, and contains a VP header and a data field;

wherein each video object plane begins with a start code, followed by a VOP header and a data field for a first video packet in the video object plane;

wherein the VOP header contains a length code that indicates a fixed length of the resync marker for the video object plane;

a start-code detector, coupled to the bitstream input, for detecting the start code at a beginning of each new video object plane;

a resync-marker detector, coupled to the bitstream input, for detecting the resync marker having the fixed length indicated by the length code from the VOP header, the resync marker being at a beginning of video packets in the video object plane;

a macroblock processor, receiving data fields from the bitstream input, for processing macroblocks in the data fields, the macroblocks representing a portion of the image frame encoded by the video object plane; and a multi-pattern resync marker decoder, coupled to the bitstream input, for comparing bits in the MPEG bitstream to a plurality of resync marker patterns having different lengths when the length code is not readable from the VOP header;

the multi-pattern resync marker decoder signaling the macroblock processor to process macroblocks in the data field of a video packet begun by a resync marker detected by the multi-pattern resync marker decoder, whereby resync markers having different lengths are detected when the length code is unreadable.

2. The error-resilient MPEG decoder of claim 1 wherein the multi-pattern resync marker decoder is activated when an error is detected in the VOP header.

3. The error-resilient MPEG decoder of claim 2 wherein either the resync-marker detector or the multi-pattern resync marker decoder is activated, wherein the resync-marker detector contains the multi-pattern resync marker decoder.

4. The error-resilient MPEG decoder of claim 2 wherein the multi-pattern resync marker decoder also compares bits after the resync marker to a VP header pattern of the VP header, the multi-pattern resync marker decoder signaling the macroblock processor to process the macroblock only when the bits in the bitstream match one of the plurality of resync marker patterns and match the VP header pattern;

whereby the VP header and the resync marker both are matched when the length code is unreadable.

5. The error-resilient MPEG decoder of claim 4 wherein the plurality of resync marker patterns have different lengths indicated by different values of the length code.

6. The error-resilient MPEG decoder of claim 5 wherein the different lengths of the resync marker patterns ranges from 17 bits to 23 bits.

7. The error-resilient MPEG decoder of claim 6 wherein the plurality of resync marker patterns each has only a single 1 bit, the single 1 bit preceded by a string of 0 bits.

8. The error-resilient MPEG decoder of claim 7 wherein the VP header contains a macroblock number and a Q-scale;

wherein the multi-pattern resync marker decoder sends the macroblock number and the Q-scale to the macroblock processor, the macroblock processor including means to use the macroblock number to identify a location within the image frame of a first macroblock in the video packet.

9. The error-resilient MPEG decoder of claim 8 wherein the length code also indicates a range of motion vectors for macroblocks in the video object plane, whereby the length code indicates the length of the resync markers and the range of the motion vectors.

10. The error-resilient MPEG decoder of claim 9 wherein the range of motion vectors is about 16 pixels for a smallest length of the resync markers, but about 1 K pixels for a largest length of the resync markers.

11. A method for recovering from an error in an f_code in a video object plane (VOP) header at a start of a frame in a video sequence comprising:

detecting a unique start code at a start of a VOP;

decoding a VOP header that follows the VOP, the VOP header containing the f_code for the VOP;

when the f_code contains an error:

(a) searching in a bitstream following the VOP header for a next resync marker by searching for a variable-length resync marker followed by a video packet VP header, wherein a bit length of the variable-length resync marker depends on a value of the f_code that contains the error;

(b) when the next resync marker is detected, extracting a macroblock number from the VP header, the macroblock number being an identifier within the frame for a first macroblock in the video packet;

(c) processing macroblock data in a data field of the video packet to generate pixel data or pixel-error terms for display, beginning with the first macroblock identified by the macroblock number;

continuing to search the bitstream for other next resync markers and processing macroblocks for other video packets by repeating steps (a), (b), and (c) until a next unique start code is detected for a next VOP;

when the f_code does not contain the error:

(f) searching in the bitstream following the VOP header for a next resync marker by searching for a fixed-length resync marker that is followed by a video packet VP header, wherein a bit length of the fixed-length resync marker is indicated by the value of the f_code from the VOP header;

(g) when the next resync marker is detected, extracting a macroblock number from the VP header, the macroblock number being an identifier within the frame for a first macroblock in the video packet;

(h) processing macroblock data in a data field of the video packet to generate pixel data or pixel-error terms for display, beginning with the first macroblock identified by the macroblock number; and continuing to search the bitstream for other next resync markers and processing macroblocks for other video packets by repeating steps (f), (g), and (h) until a next unique start code is detected for a next VOP, whereby macroblock data is processed for video packets in the VOP having the error in the f_code.

12. The method of claim 11 wherein searching the bitstream for the fixed-length resync marker comprises searching for K sequential bits of 0 followed by a 1 bit, wherein K is 15 larger than the f_code.

13. The method of claim 12 wherein searching the bitstream for the variable-length resync marker comprises searching for K sequential bits of 0 followed by a 1 bit, wherein K is all integers from 16 to 22.

14. The method of claim 13 wherein searching the bitstream for the variable-length resync marker further comprises searching for a 7-bit or 9-bit macroblock number after the 1 bit, followed by a 5-bit Q-scale factor, followed by a 1 bit;

wherein the 7-bit or 9-bit macroblock number and the 5-bit Q-scale factor can have any values.

15. The method of claim 14 wherein the 7-bit macroblock number is employed when the video sequence has a Quarter-Common-Image format (QCIF), but the 9-bit macroblock number is employed when the video sequence has a Common-Image format (CIF), wherein the CIF format has a higher resolution and a larger number of macroblocks in a frame than the QCIF format.

16. The method of claim 14 wherein processing macroblock data further comprises:

multiplying pixel data or error terms by the Q-scale factor, whereby pixel data or error terms are scaled.

17. A motion-picture-experts group (MPEG) bitstream decoder comprising: parser means for receiving a bitstream containing bit errors, the bitstream encoding compressed video arranged as video object planes (VOP) each having a plurality of video packets (VP);

macroblock decoder means, coupled to the parser means, for extracting video macroblocks from data fields in the bitstream;

start-code decoder means, coupled to the parser means, for detecting a start code in the bitstream, the start code for marking a start of a video object plane;

VOP header means, coupled to the parser means, for reading a length code from a VOP header that follows the start code;

multi-pattern resync marker decoder means, coupled to the parser means and receiving the length code from the VOP header means, for detecting a resync marker in the bitstream having a bit-length indicated by the length code and for signaling the macroblock decoder means to extract the video macroblocks when the resync marker is detected, the resync marker for marking a beginning of a video packet; and code-error recovery means, activated when the VOP header means is unable to read the length code when the VOP header contains a bit error, for signaling the multi-pattern resync marker decoder means to search the bitstream for a plurality of resync marker patterns having different bit lengths, the multi-pattern resync marker decoder means signaling the macroblock decoder means to extract the video macroblocks when the bitstream contains any of the plurality of resync marker patterns;

wherein the resync marker in a corrupted bitstream is detected when a bit error occurs in the length code in the VOP header, whereby the bitstream is recovered from the length code that is corrupted.

18. The MPEG bitstream decoder of claim 17 wherein each video packet comprises a resync marker or a start code followed by a header and a data field, the data field containing video macroblocks;

wherein the macroblock decoder means includes means for extracting macroblocks from a data field of a video packet in a corrupted video object plane, the corrupted video object plane having a bit error in the length code, whereby data is recovered from subsequent video packets in the corrupted video object plane with the bit error in the length code.

19. The MPEG bitstream decoder of claim 18 wherein the multi-pattern resync marker decoder means further comprises:

VP header match means, receiving the bitstream, for detecting when a portion of the bitstream after a detected resync marker matches a header pattern of a VP header, wherein the header pattern include a field for a macroblock number and a field for a scale factor and a 1 bit, whereby the VP header is also matched.

20. The MPEG bitstream decoder of claim 19 further comprising:

VP header means, coupled to the VP header match means, for outputting a macroblock number extracted from the macroblock number field and for outputting a scale factor extracted from the scale factor field.

\* \* \* \* \*